United States Patent [19]
Otto et al.

[11] 3,908,803
[45] Sept. 30, 1975

[54] ADJUSTING DEVICE FOR BRAKES

[75] Inventors: Alfred Otto; Hermann Josef Feldhoff, both of Remscheid; Heinrich Kupiek, Holzwickede; Gerd Brackelmann, Unna-Uelzen, all of Germany

[73] Assignees: Bergische Stahl-Industrie, Remscheid; Montanhydraulik GmbH Co. KG, Holzwickede, both of Germany

[22] Filed: Apr. 19, 1974

[21] Appl. No.: 462,338

[52] U.S. Cl...... 188/71.8; 188/196 P; 188/79.5 GE; 192/111 A
[51] Int. Cl.² ......................................... F16D 65/52
[58] Field of Search ............. 188/72.9, 71.8, 196 P, 188/79.5 GE, 196 D, 196 F; 192/111 A

[56] References Cited
UNITED STATES PATENTS

| | | | |
|---|---|---|---|
| 1,808,079 | 6/1931 | Seddon et al. | 188/196 P |
| 3,253,682 | 5/1966 | Hayden | 188/196 P |
| 3,326,328 | 6/1967 | Caero | 188/72.9 |
| 3,548,974 | 12/1970 | Klaue | 188/72.9 |
| 3,664,469 | 5/1972 | Maurice | 188/72.9 |
| 3,690,417 | 9/1972 | Airheart | 188/71.8 |

FOREIGN PATENTS OR APPLICATIONS

| | | | |
|---|---|---|---|
| 482,712 | 7/1953 | Italy | 188/196 P |
| 1,213,896 | 11/1970 | United Kingdom | 188/71.8 |

*Primary Examiner*—Trygve M. Blix
*Assistant Examiner*—Edward R. Kazenske
*Attorney, Agent, or Firm*—Walter Becker

[57] ABSTRACT

An adjusting device for brakes, especially for rail vehicles, in which at least one support with a brake lining is arranged on a brake lever which is pivotable about a turnable shaft on a brake bridge or brake saddle or the like, while a return spring is connected on one hand with the above mentioned shaft and on the other hand with a part, that is stationary relative to the brake lever. The device also includes a slip clutch connecting the shaft to the brake lever, and furthermore includes first abutment means for limiting the rotary movement of the shaft during a braking operation, and second abutment means for limiting the movement of the brake lever during the brake disengagement operation.

10 Claims, 3 Drawing Figures

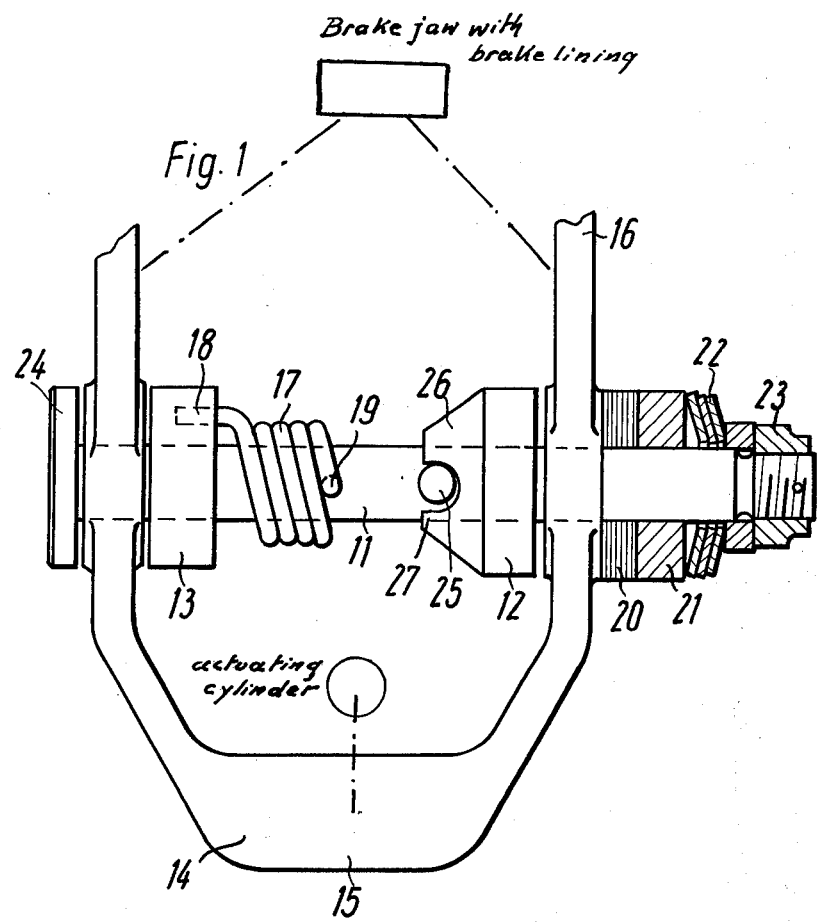
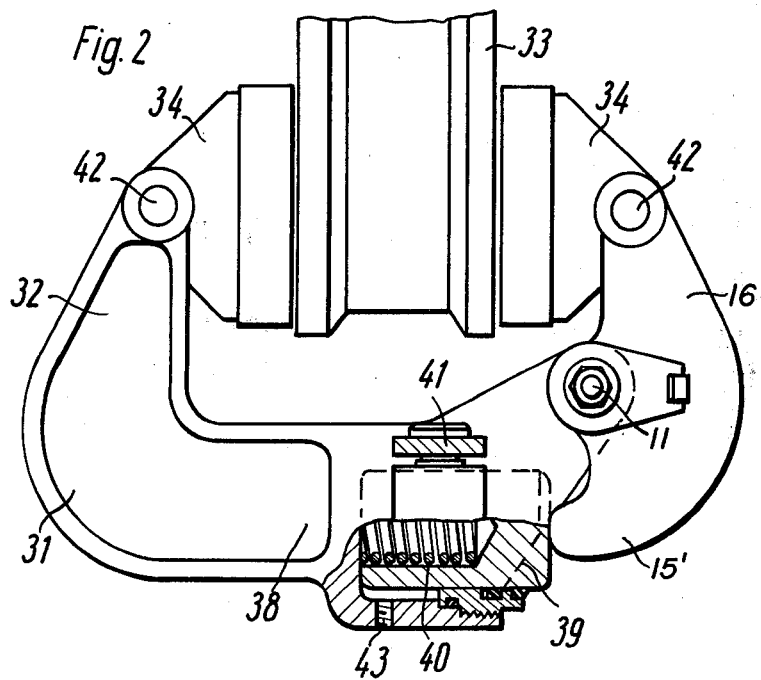

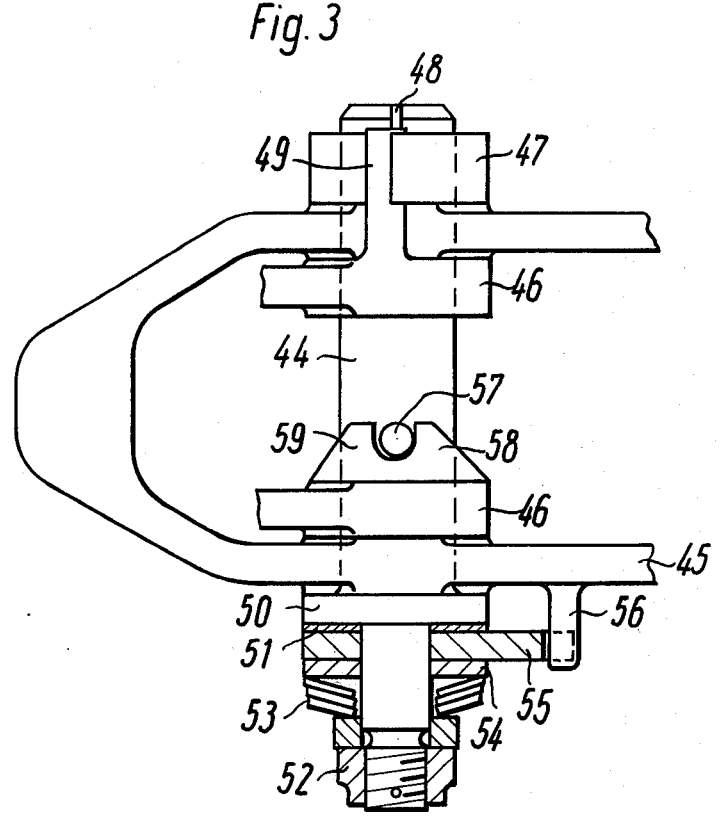

ADJUSTING DEVICE FOR BRAKES

The present invention concerns an adjusting device for adjusting brakes for rail vehicles in which at least one brake lining support is arranged on a brake lever which is at least approximately parallel or tangential to a brake surface, and in which the brake lever is linked to a brake bridge, brake saddle, brake yoke, or a fixed point for pivotal movement about an axle while a return spring is provided, said brake being operable by means engaging said brake lever.

Numerous devices for post adjusting brakes have been suggested which, however, in one or the other shape have various drawbacks. Heretofore, generally the adjusting device was with hydraulic or pneumatic brakes provided directly in the brake cylinder, while a clamping element serves as abutment for the disengaging movement of the brake piston which clamping element is displaced when moving beyond the admissible or set release play. In other instances, a double piston with self-adjusting torsion spring was suggested in order to assure a safe function of the adjusting device.

Furthermore, adjusting devices have become known which are arranged on a shaft while either the adjustment is effected manually by means of a worm drive or while in the last mentioned instance a particularly complicated additional linkage system had to be provided.

It is, therefore, an object of the present invention to provide an adjusting device for the above mentioned purpose, which will be of a relatively simple construction and nevertheless will safely adjust the once provided disengaging play regardless of the wear of the brake lining or of the ware of other parts.

It is another object of this invention to provide an adjusting device as set forth in the preceding paragraph which is so simple in its design that it will nevertheless withstand the rough operation in railway systems. It is a well-known fact that brakes are exposed to extremely severe weather conditions during operation particularly inasmuch as they have to be in the immediate vicinity of the wheels and thus are subjected to dust, dirt, water, etc., whereby they can easily be soiled. In this connection a strong and simple design is of importance which will not be changed by any weather influences.

These and other objects and advantages of the invention will appear more clearly from the following specification in connection with the accompanying drawings, in which:

FIG. 1 is a diagrammatical illustration of the adjusting device according to the invention.

FIG. 2 is a top view of the brake saddle with built-in adjusting device according to the invention.

FIG. 3 shows a side view of the arrangement of FIG. 2 while parts which are not important for the function of the adjusting device have been omitted.

The adjusting device according to the present invention is characterized primarily in that the return spring is connected on one hand with the shaft which forms the axle and is loosely journalled and on the other hand is connected to the part which is stationary relative to the brake lever, while said shaft is through a slip clutch connected to the brake lever, and while a first abutment limits the movement of the shaft during the braking operation, and a second abutment limits the movement of the brake lever when disengaging the brake.

Expediently, the return force of the spring is less than the friction force of the slip clutch, and said first and second abutments act together by means of a cam pin or the like arranged on said shaft.

Advantageously, the adjusting device according to the invention is with a brake having a disc with a partial lining provided on the shaft of a brake lever which is linked to a floatingly mounted brake saddle, said brake lever being adapted to be actuated by a cylinder piston system which is arranged approximately parallel to the axis of the brake disc.

Referring now to the drawings in detail, the adjusting device illustrated therein comprises a shaft 11 which is loosely journalled in the eyes 12 and 13 of a part for instance the brake saddle or the housing that is stationary relative to the brake lever 14. The side 15 is engaged by the actuating cylinder while the supporting torsion-coiled spring which carries the brake lining is linked to the two other non-illustrated ends 16. Journalled on shaft 11 is a torsion spring 17 which on one hand has its end 18 anchored in the stationary eye 13 while the other spring end 19 is located in a corresponding bore of shaft 11. This spring 14 generates the return force for rearward setting the brake linings. A slip clutch effects a connection between the brake lever 14 and the shaft 11. This brake clutch comprises a brake lining 20 which by means of an intermediate disc 21 is pressed by an adjustable dish spring 22 against the brake lever 14. For purposes of adjusting the force of the dish springs 22, a nut 23 is provided on shaft 11. One end of shaft 11 is provided with a flange 24 by which it rests against a brake lever 14. Furthermore, shaft 11 has connected thereto a pin 25 which is located between two abutments 26 and 27, said abutments being arranged on a fixed eye 12 of the housing. Pin 25 can between these two abutments carry out only such a movement as it corresponds to the disengaging play.

This device acts by the fact that normally the return spring 17 turns the shaft 11 and thus the brake lever 14 until the pin 25 engages the abutment 27. At this time the brake jaws have the previously set and determined disengaging play relative to the brake surface. If the brake is now actuated, part 15 of the brake lever 14 is by the actuating cylinder swept upwardly out of the second plane. With this pivoting movement, simultaneously shaft 11 is turned through the intervention of the slip clutch 20. Due to the fact that the force of the slip clutch exceeds return force of spring 17, the latter is tensioned or loaded. The movement of shaft 11 with the brake lever normally occurs until the brake lining firmly engages the friction surface of the brake disc. The brake will then brake if the wear exceeds a predetermined value corresponding to the disengaging play, the brake disc engages the abutment 26 whereby a further rotation of shaft 11 will be prevented. Inasmuch as the brake linings are, however, not yet in braking engagement, the brake lever 14 is turned further and more specifically against the thrust of the slip clutch 20. Thus, the brake lever 14 and shaft 11 are turned relative to each other. After the completion of the braking operation, the return spring 17 turns shaft 11 to its disengaging position while the brake lever 14 is carried along through the intervention of the slip clutch 20. When pin 25 has reached its abutment 27 whereby the disengaging play is intended, the rotation and disengaging movement of the brake lever is completed. Simultaneously the disengagement play is again properly adjusted. The play may now begin from the start which means that nothing will happen as long as the wear remains between the two abutments 26 and 27 without pin 25 engaging the abutment 26. Only when this wear is exceeded, pin 25 will engage the abutment 26 thereby turning shaft 11 again relative to the brake lever 14 whereby the disengagement play is set to the correct value. Thus it cannot happen that too much disengagement play prevails because already a slight excess of the disengagement play amounting to a few tenths of a millimeter will bring about a readjustment.

According to FIG. 2, an adjusting device according to the invention is built into a disc brake with partial brake lining, according to which a brake saddle 31 has its arm 32 embrace the brake disc 33. Linked to the arm 32 of the brake saddle is a brake lining support 34 with the brake lining. To the other end of the brake saddle 31 on shaft 11 which corresponds to the shaft 11 of FIG. 1, there is linked a brake lever 16 the front end of which has linked thereto a support 34 with the brake lining. The brake lever 16 is extending beyond the shaft 11. A brake cylinder 39 arranged at least approximately parallel to the axis of the disc brake acts upon the extension 151, said cylinder 39 being provided in the yoke 38 of the brake saddle 31. In the piston of the brake cylinder 39 there is mounted a spring 40. The brake saddle is by means of a vertical suspension link 41 suspended on the housing or a similar part of the vehicle and furthermore vertical suspension links are arranged on the pivot points 42.

This device operates by the fact that hydraulic fluid pumped into the actuating cylinder 39 through the inlet 43, whereby the piston of the cylinder 39 acts upon the extension 15' of the brake lever 16 so as to pivot the latter about the shaft 11 to such an extent that the brake lining of the support 34 will engage the brake disc 33. By means of the reaction force, the brake lining located on the other side is likewise pressed against the brake surface of the brake disc. By means of the suspension links, the brake saddle is floatingly mounted and in this way will be able to follow the corresponding movements in vertical direction. After a plurality of times an adjustment of the adjusting device has been effected, it will be appreciated that with an automatic brake cylinder, a distance between the piston and the end 15' of the brake lever will form. In order to prevent this, a relatively weak spring 40 is arranged in the piston of the brake cylinder, said spring being adapted always to move the piston into the engagement with the part 15' of the brake lever 16.

FIG. 3 shows another embodiment of the device according to the invention in which shaft 44 for the brake lever 45 mounted in the fixed eyes 46, is extended beyond the lower end where it carries a coiled spring 47 forming the return spring. This spring is on one hand anchored in a slot 48 to the shaft and on the other hand is anchored in an abutment 49 which is connected with the fixed eye 46 and bridges the loose brake lever 45. As a result thereof, higher return spring forces are generated. The slip clutch is so designed that shaft 44 outside the brake lever is provided with a flange 50 on which is arranged a friction lining 51 which is compressed by the spring dish 53 which is adjustable by the nut 52. Between the pressure disc 54 and the friction lining 51 there is arranged a lever or arm 55 which cooperates with a cam 56 on brake lever 45. Arranged on shaft 44 is a pin 57 cooperating with two abutments 58 and 59 arranged on the fixed part 46. The possibility of movement of pin 57 corresponds to the disengaging play of the brake linings. The operation of this device corresponds approximately to the operation of the device of FIG. 1 according to which the brake lever is turned until the brake linings engage the brake disc. If with this movement during too high a wear, the disengagement play is exceeded, the pin 57 will engage the abutment 58 to rest thereon, and cam 56 is turned relative to shaft 44 against the holding force of the friction lining of the slip clutch. If the brake is again disengaged the return spring 47 turns shaft 44 back and more specifically until the pin 57 engages the rear abutment 59. In this connection, the brake lever 45 is carried along by shaft 44 through the intervention of the slip clutch 50, 51, the lever 55, and the abutment or cam 56 provided on the brake lever 45. When pin 57 engages the rearward abutment 59, the brake linings have the correct disengagement play, which means the proper previously determined distance from the braking surface or brake disc.

Various embodiments of the adjusting device according to the invention are possible in particular the different arrangement of the various necessary abutments and the different design of the slip clutch or the transfer elements from the shaft to the brake lever. The brake lever may without causing any difficulties have only one arm or it may be cranked or offset or designed in any other suitable way. Also the return spring may have various shapes which means it does not under all circumstances have to be a coiled spring but may also be another spring such as a bent spring, torsion spring or another elastic element which, however, always have to cooperate with the shaft and must not directly act upon the brake lever.

The actuation of the brake lever may likewise be selected in conformity with the circumstances. Also the arrangement of this device is not limited to disc brakes with partial lining but may also be employed with any other type of brake with which a lever equipped with brake jaws is pivotable relative to a fixed part and is linked thereto. On the shaft of this pivotable part there may be provided an adjustable device according to the invention.

As will be evident from the above, the advantage of the design according to the present invention is seen primarily in that it is relatively simple, rugged, and is composed of known structural elements while nevertheless the safe operation of the device is in no way affected thereby. Even when soiled to a high extent, the efficiency of the device according to the invention will not be affected. In addition thereto, and this appears to be the most important advantage of the design according to the invention, no additional space is required by the device according to the invention because only the already present elements are slightly changed and perform new functions.

It is, of course, to be understood that the present invention is, by no means, limited to the specific showing in the drawings but also comprises any modifications within the scope of the appended claims.

What we claim is:

1. An adjusting device, especially for rail vehicles, which includes: stationary supporting means, shaft means turnably mounted in said supporting means, brake lever means pivotably supported by said shaft means, a brake disc, brake means operatively connected to said brake lever means for selective braking engagement and disengagement with said brake disc, slip clutch means frictionally coupling said shaft means to said brake lever means, limit stop means fixedly connected to a peripheral portion of said shaft means so as to turn therewith, first and second abutment means arranged stationarily with regard to said shaft means and said stop means to respectively engage the latter and stop the turning movement of said shaft means in braking direction and in brake disengaging direction respectively, and spring means having one end portion thereof operatively connected to one of said stationary supporting means and having its other end portion operatively connected to said shaft means so as continuously to urge said shaft means in brake disengaging direction.

2. A device according to claim 1, in which said spring means and said friction clutch are so selected that the returning force of said spring means is less than the frictional force of said slip clutch means.

3. A device according to claim 1, which includes arm means operatively connected to said slip clutch means, and in which said brake lever means includes means operatively connected to said arm means.

4. A device according to claim 1, in which the distance between said limit stop means and said second abutment means corresponds to the desired brake disengagement play.

5. A device according to claim 1, in which said supporting means includes a brake saddle supporting said shaft means, and which comprises fluid operable cylinder piston means operatively connected to said brake lever means for actuating same.

6. A device according to claim 5, in which said brake means are arranged on opposite sides of said brake disc, said cylinder-piston means being at least approximately parallel to the axis of said brake disc.

7. A device according to claim 1, in which said spring means is a coil spring.

8. A device according to claim 1, in which said spring means is a torsion spring.

9. A device according to claim 3, in which said shaft means is provided with flange means having a friction lining arranged thereon, and which includes spring dish means arranged in substantially axial alignment with said shaft means and continuously urging said arm means into frictional engagement with said slip clutch means.

10. A device according to claim 6, which includes spring means arranged in said cylinder-piston means and continuously holding said piston means in operative engagement with said brake lever means.

* * * * *